(12) United States Patent
Ogawa

(10) Patent No.: US 11,546,479 B2
(45) Date of Patent: Jan. 3, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Hirofumi Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 181 days.

(21) Appl. No.: 16/942,756

(22) Filed: Jul. 29, 2020

(65) Prior Publication Data

US 2021/0266417 A1 Aug. 26, 2021

(30) Foreign Application Priority Data

Feb. 26, 2020 (JP) .............................. JP2020-030305

(51) Int. Cl.
*G10L 15/22* (2006.01)
*H04N 1/00* (2006.01)
*G06F 3/16* (2006.01)

(52) U.S. Cl.
CPC ......... *H04N 1/00403* (2013.01); *G06F 3/167* (2013.01); *G10L 15/22* (2013.01); *G10L 2015/223* (2013.01)

(58) Field of Classification Search
CPC .................................................. H04N 1/00403
See application file for complete search history.

(56) References Cited

U.S. PATENT DOCUMENTS

| 2014/0078534 | A1* | 3/2014 | Oda ...................... G06F 3/1219 |
| | | | 358/1.15 |
| 2014/0240450 | A1* | 8/2014 | Morita ................ H04L 12/1822 |
| | | | 348/14.12 |
| 2018/0322870 | A1* | 11/2018 | Lee ..................... H04N 21/4394 |
| 2019/0267020 | A1* | 8/2019 | Kim ...................... G10L 21/034 |

FOREIGN PATENT DOCUMENTS

JP 2019160187 9/2019

* cited by examiner

*Primary Examiner* — Ibrahim Siddo
(74) *Attorney, Agent, or Firm* — JCIPRNET

(57) ABSTRACT

An information processing apparatus includes a processor configured to receive an instruction to execute a service by utterance, and perform control to present execution information regardless of whether or not a setting for presenting the execution information is performed, the execution information being information indicating an execution result of the received service.

19 Claims, 9 Drawing Sheets

EXECUTION INFORMATION PRESENTATION SCREEN     90A

FOLLOWING SERVICE
IS PERFORMED WITH FOLLOWING IMAGE FORMING
APPARATUS AS SHOWN IN FIGURE BELOW.

- SERVICE: IMAGE PRINTING
- EXECUTION APPARATUS: IMAGE FORMING APPARATUS A

ITEM 1     ITEM 2     . . .

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2020-030305 filed Feb. 26, 2020.

BACKGROUND

(i) Technical Field

The present invention relates to an information processing apparatus and a non-transitory computer readable medium storing an information processing program.

(ii) Related Art

JP2019-160187A discloses a photobook production system including a server apparatus that stores image data received from a user terminal and a smart speaker that is communicatively connected to the server apparatus for outputting a voice and collecting sound of utterance of a user, in which the server apparatus includes an interaction processing unit that understands a voice of the user inputted via the smart speaker, generates a response sentence for the user, and outputs the response sentence to the user via the smart speaker, an image selection unit that, in a case where the voice of the user is a photobook production instruction, selects a plurality of images from images to be stored, and an editing processing unit that generates photobook data by using the image selected by the image selection unit, and transmits a preview screen of the photobook data to the user terminal.

SUMMARY

Conventionally, in a case where setting not to present execution information, which is information indicating an execution result of a service whose execution is instructed by utterance, has been made in advance, there is a problem that a service different from the service whose the execution is instructed by the utterance may be executed due to erroneous recognition of the utterance.

Aspects of non-limiting embodiments of the present disclosure relate to an information processing apparatus and a non-transitory computer readable medium storing an information processing program that can prevent a service different from a service whose execution is instructed by utterance from being executed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive an instruction to execute a service by utterance, and perform control to present execution information regardless of whether or not a setting for presenting the execution information is performed, the execution information being information indicating an execution result of the received service. In the present invention, the execution information includes, in addition to the information indicating the execution result of the service in a case where the control to execute the service has already been performed, information indicating in advance the execution result of the service assumed in a case where the control to execute the service is performed although the control to execute the service has not yet been performed.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings. In the present invention, a case where the information processing apparatus is applied to a server will be described.

First Exemplary Embodiment

In the exemplary embodiment, a case where the present invention is applied to an image forming system that executes services for a plurality of image forming apparatuses will be described.

First, a configuration of an image forming system 1 according to the exemplary embodiment will be described with reference to FIG. 1.

Figure 1:
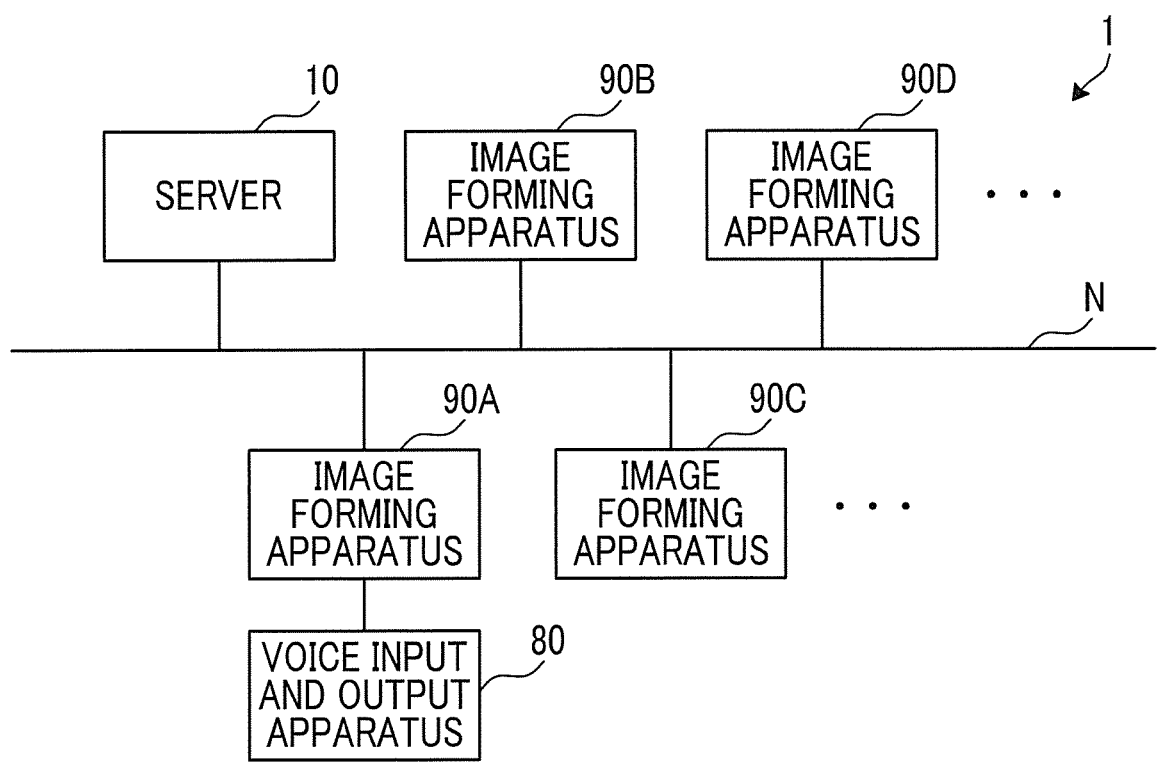
FIG. 1 is a block diagram showing an example of a configuration of an image forming system according to a first exemplary embodiment.

As shown in FIG. 1, the image forming system 1 according to the exemplary embodiment includes a server 10 that plays a central role in the present system, and a plurality of image forming apparatuses 90A, 90B, and . . . . Hereinafter, in a case where the image forming apparatuses 90A, 90B, and . . . are described without distinction, the image forming apparatuses will be simply referred to as an "image forming apparatus 90".

The server 10 and the plurality of image forming apparatuses 90 are connected via a network N, and the server 10 can communicate with each image forming apparatus 90 via the network N. In the exemplary embodiment, a communication line within a company such as a local area network (LAN) and a wide area network (WAN) is applied as the network N, but the present invention is not limited to this form. As the network N, for example, a public communication line such as the Internet or a telephone line may be applied, or a communication line within a company and a public communication line may be applied in combination. In addition, in the exemplary embodiment, a wired communication line is applied as the network N, but the present invention is not limited to this form, and a wireless communication line may be applied, and wired and wireless communication lines may be applied in combination.

In the image forming system 1 according to the exemplary embodiment, a voice input and output apparatus 80 is connected to a part of the image forming apparatuses 90 (the image forming apparatus 90A in the exemplary embodiment) in the plurality of image forming apparatuses 90. The voice input and output apparatus 80 according to the exemplary embodiment has a function of inputting a voice uttered by a user as voice data and a function of outputting a voice based on predetermined voice data.

In the image forming system 1 according to the exemplary embodiment, the voice input and output apparatus 80 is indirectly controlled by the server 10 via the image forming apparatus 90A, but the present invention is not limited to this. For example, the voice input and output apparatus 80 may be connected to the server 10 without using the image forming apparatus 90A, and the voice input and output apparatus 80 may be directly controlled by the server 10. In addition, in the exemplary embodiment, a case where the voice input and output apparatus 80 is configured separately from the image forming apparatus 90A will be described, but the present invention is not limited to this, and the voice input and output apparatus 80 may be integrally incorporated in the image forming apparatus 90 A.

Next, a configuration of the server 10 according to the exemplary embodiment will be described with reference to FIGS. 2 and 3. Examples of the server 10 include information processing apparatuses such as personal computers and server computers.

Figure 2:
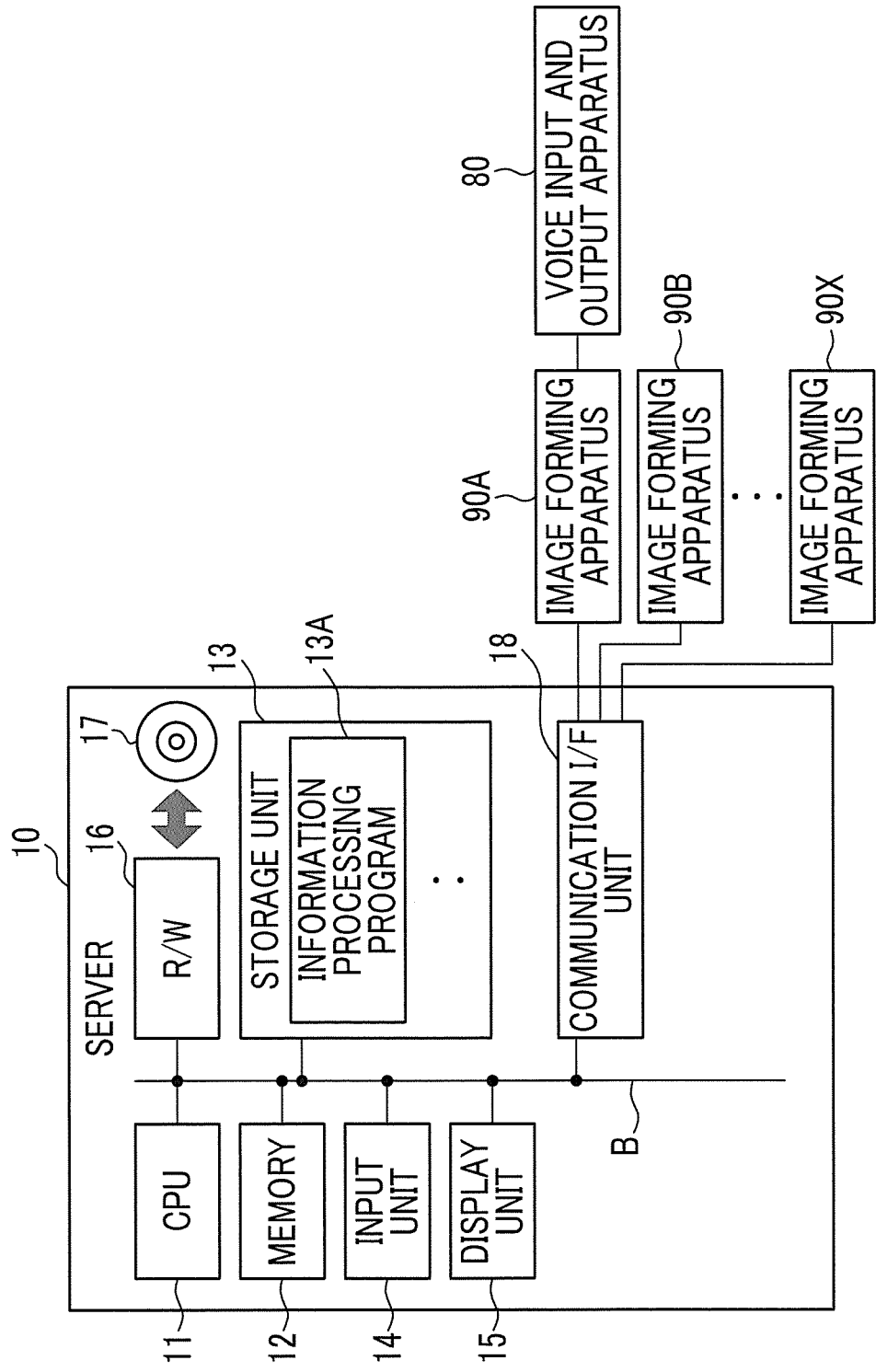
FIG. 2 is a block diagram showing an example of a hardware configuration of a server according to the first exemplary embodiment.
Figure 3:
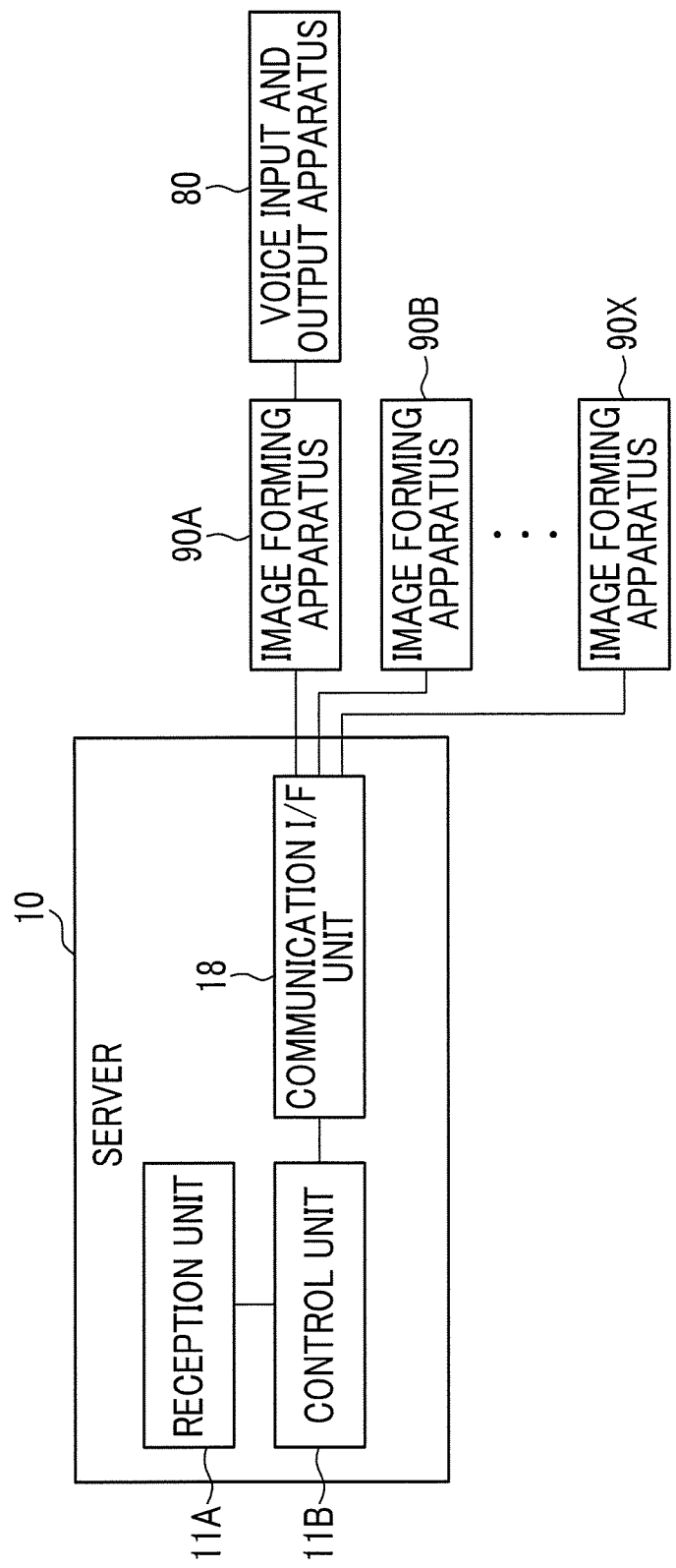
FIG. 3 is a block diagram showing an example of a functional configuration of the server according to the first exemplary embodiment.

As shown in FIG. 2, the server 10 according to the exemplary embodiment of includes a central processing unit (CPU) 11 as a processor, a memory 12 as a temporary storage region, a nonvolatile storage unit 13, an input unit 14 such as a keyboard and a mouse, a display unit 15 such as a liquid crystal display, a medium reading and writing apparatus (R/W) 16, and a communication interface (I/F) unit 18. The CPU 11, the memory 12, the storage unit 13, the input unit 14, the display unit 15, the medium reading and writing apparatus 16, and the communication I/F unit 18 are connected to each other via a bus B. The medium reading and writing apparatus 16 reads information written in a recording medium 17 and writes information in the recording medium 17.

The storage unit 13 is realized by a hard disk drive (HDD), a solid state drive (SSD), a flash memory, and the like. An information processing program 13A is stored in the storage unit 13 as a storage medium. The information processing program 13A is stored in the storage unit 13 in a case where the recording medium 17 in which the information processing program 13A has been written is set in the medium reading and writing apparatus 16, and the medium reading and writing apparatus 16 reads the information processing program 13A from the recording medium 17. The CPU 11 reads the information processing program 13A from the storage unit 13, expands the information processing program 13A in the memory 12, and sequentially executes a process included in the information processing program 13A.

Next, a functional configuration of the server 10 according to the exemplary embodiment will be described with reference to FIG. 3. As shown in FIG. 3, the server 10 includes a reception unit 11A and a control unit 11B. The CPU 11 of the server 10 functions as the reception unit 11A and the control unit 11B by executing the information processing program 13A.

The reception unit 11A according to the exemplary embodiment receives an instruction to execute a service using the image forming apparatus 90 by utterance via the voice input and output apparatus 80. In the exemplary embodiment, the reception unit 11A acquires the execution instruction of the service from the image forming apparatus 90A via the communication I/F unit 18, but the present invention is not limited to this as described above. In addition, in the exemplary embodiment, an image printing service is applied as the above-described service, but the present invention is not limited to this form, and for example, the image reading service and the image transmission service may be applied. Further, in the exemplary embodiment, in addition to a process that is performed as the above-described service without charge, a process that is performed for a fee is also included.

In addition, the control unit 11B according to the exemplary embodiment performs control to present execution information regardless of whether or not setting for presenting the execution information, which is information indicating the execution result of the service received by the reception unit 11A, is performed. In the exemplary embodiment, the control unit 11B performs control to present the execution information before performing control to execute the service. Further, in the exemplary embodiment, presentation by a display on a display unit of the image forming apparatus 90A is applied as the presentation.

The control unit 11B according to the exemplary embodiment performs control to present the execution information in a case where a predetermined condition is satisfied, but the present invention is not limited to this form. For example, an aspect may be applied in which the control unit 11B performs the control presented above each time the reception unit 11A receives an instruction to execute a service.

In the exemplary embodiment, a condition that the number of settings required for the service is equal to or more than a predetermined number and a condition that an apparatus as an execution target of the service cannot be specified are applied as the predetermined conditions. In addition, in the exemplary embodiment, a condition that content of the service includes a predetermined expression and a condition that a degree of influence of the execution result is larger than a predetermined degree are applied as the predetermined conditions. Further, in the exemplary embodiment, a condition that a volume of the utterance is equal to or less than a predetermined level and a condition that a volume of noise generated in parallel with the utterance is equal to or more than a predetermined level are applied as the predetermined conditions. However, the present invention is not limited to the exemplary embodiments, and as the predetermined conditions, a single of each condition or a combination of a plurality of conditions may be applied including a condition that a speaker, who has given the instruction, uses the information processing apparatus for the first time in addition to the above conditions.

In addition, the reception unit 11A according to the exemplary embodiment further receives the instruction by the speaker, who has given the instruction, according to the presentation of the execution information, and the control unit 11B according to the exemplary embodiment further performs control to execute the service according to the received instruction.

The control unit 11B according to the exemplary embodiment performs control to cause the image forming apparatus 90, which is configured separately from the server 10, to execute the received service, but the control unit 11B may be configured integrally. In addition, in the exemplary embodiment, a smart speaker is applied as the voice input and output apparatus 80, but the present invention is not limited to this. For example, another device capable of inputting and outputting voice such as a smartphone and a portable information terminal apparatus may be applied as the voice input and output apparatus 80. Further, in the exemplary embodiment, a digital multi-function apparatus having an image printing function, an image reading function, an image transmission function, and the like is applied as the image forming apparatus 90, but needless to say, the present invention is not limited to this.

Figure 4:
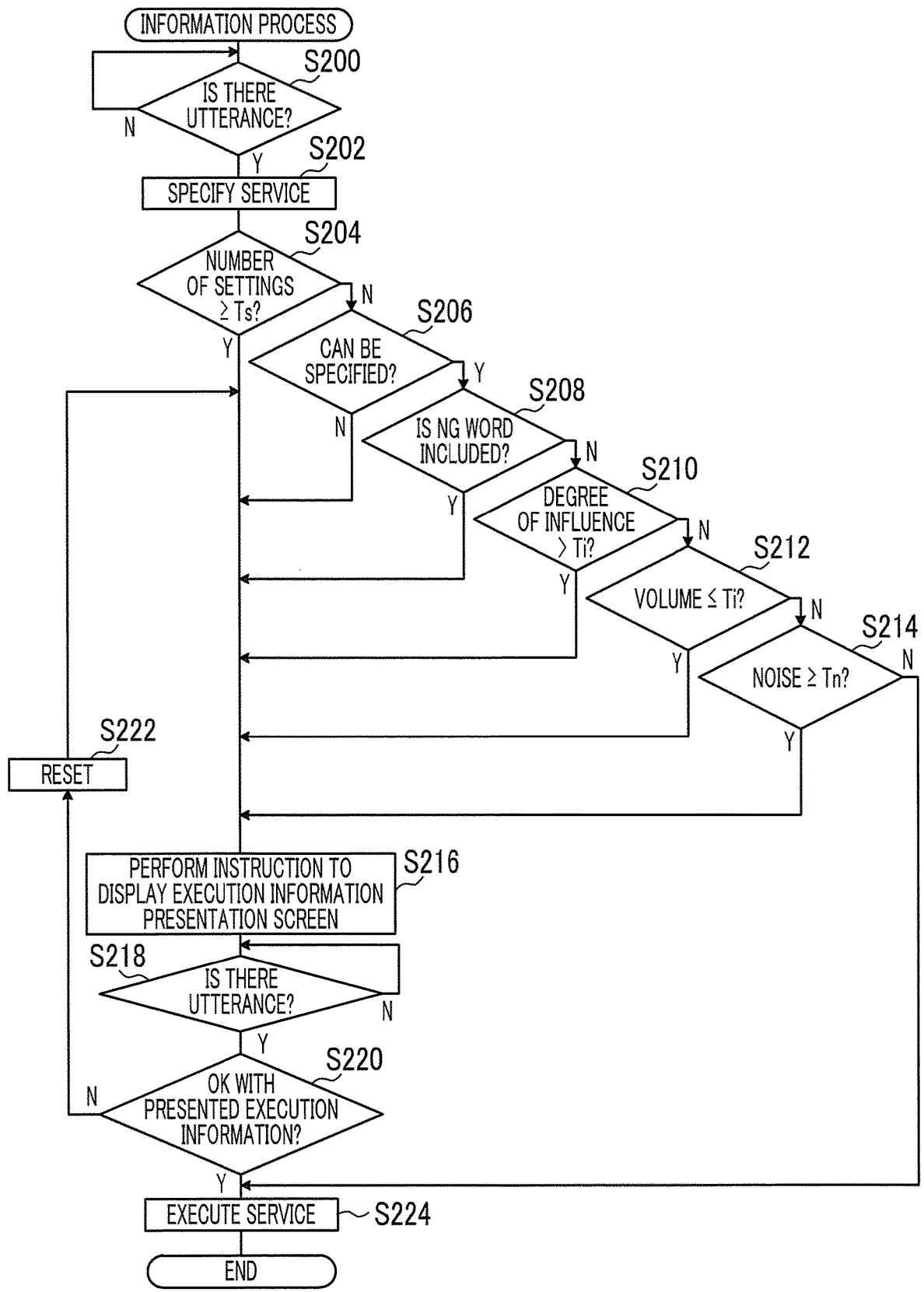
FIG. 4 is a flowchart showing an example of a flow of an information process according to the first exemplary embodiment.

Next, an operation of the server 10 in a case of executing an information process will be described with reference to FIG. 4. The information process shown in FIG. 4 is executed by the CPU 11 of the server 10 executing the information processing program 13A.

In step S200, the CPU 11 waits until an instruction to execute a service is performed via the voice input and output apparatus 80 by utterance of any speaker. In step S202, the CPU 11 specifies the service instructed by the utterance received in the process of step S200 by using a conventionally known voice recognition technique. Hereinafter, the specified service is referred to as a "specific service".

In the next step S204, the CPU 11 determines whether or not the number of settings required for the specific service is equal to or more than a predetermined number Ts. As a result, in a case where the determination is positive, the process proceeds to step S216 described later, while in a case where the determination is negative, the process proceeds to step S206. In the exemplary embodiment, the number of original manuscripts to be printed on one print sheet and a resolution of a print image are applied as the settings required for the specific service, but the settings are not limited to these. For example, the presence or absence of color printing may be applied as the settings required for the specific service, or the setting may be applied individually or in a combination of a plurality of settings. In addition, in the exemplary embodiment, the number set in advance by the user of the server 10 or the like is applied as the predetermined number Ts, but the number automatically set according to the frequency with which the image forming apparatus 90 may be set as the predetermined number Ts.

For example, in a case where "2" is set as the predetermined number Ts, and the speaker utters "print two original manuscripts on one print sheet", since the set number is 1, the CPU 11 proceeds to step S206. On the other hand, in a case where the speaker utters "print two original manuscripts on one print sheet and print the print image at a resolution of 600 dpi", the CPU 11 proceeds to step S216.

In step S206, the CPU 11 determines whether or not the image forming apparatus 90 as an execution target of the specific service can be specified. As a result, in a case where the determination is negative, the process proceeds to step S216 described later, while in a case where the determination is positive, the process proceeds to step S208. In the exemplary embodiment, as the case where the CPU 11 cannot specify the image forming apparatus 90 as the execution target of the specific service is to be executed, a case where a plurality of image forming apparatuses 90 exist in an identical room is applied, but the present invention is not limited this. For example, as the case where the CPU 11 cannot specify the image forming apparatus 90, a case where the image forming apparatus 90 does not exist in a room identical with a room in which the voice input and output apparatus 80 exists may be applied.

In step S208, the CPU 11 determines whether or not the content of the specific service includes a predetermined expression (denoted by an "NG word" in FIG. 4). As a result, in a case where the determination is positive, the process proceeds to step S216 described later, and in a case where the determination is negative, the process proceeds to step S210. In the exemplary embodiment, the text of the original manuscript that causes the image printing service to be executed is applied as the content of the specific service. In addition, in the exemplary embodiment, as the above-described predetermined expression, "top secret", "secret", and "confidential" that are items related to security are applied, but a single of each item or a combination of a plurality of items may be applied.

In step S210, the CPU 11 determines whether or not a degree of influence of the execution result of the specific service is larger than a predetermined degree Ti. As a result, in a case where the determination is positive, the process proceeds to step S216 described later, while in a case where the determination is negative, the process proceeds to step S212. In the exemplary embodiment, the high fee for executing the image printing service is applied as the degree of influence of the execution result, but the present invention is not limited to this form. For example, as the degree of influence of the execution result, the number of sheets of original manuscript for executing the image printing service may be applied, or the total value (however, in a case where unit systems of the degrees of influence are different, needless to say, the total value is calculated by aligning the unit systems) of these degrees of influence may be applied. In addition, in the exemplary embodiment, the fee or the number of sheets set in advance by the user of the server 10 or the like are applied as the predetermined degree Ti, but the number automatically set according to the frequency with which the image forming apparatus 90 may be set as the predetermined degree Ti. Furthermore, in the exemplary embodiment, whether or not the specific service is a paid service for a fee may be applied as the degree of influence of the execution result. In this case, in a case where the specific service is a paid service, the determination is positive in step S210, and in a case where the specific service is a free service, the determination is negative in step S210.

In step S212, the CPU 11 specifies a volume of the utterance by using sound pressure of the utterance as an example from voice data input at the time of executing the process in step S200, and determines whether or not the volume is equal to or less than a predetermined level Tl. In a case where the determination in step S212 is positive, the process proceeds to step S216 described later, while in a case where the determination is negative, the process proceeds to step S214. In the exemplary embodiment, in a case where the volume of the utterance is smaller than the predetermined level Tl, recognition of the utterance is difficult, so that a value obtained by a preliminary experiment using an actual machine or a computer simulation or the like is applied, but the present invention is not limited to this. For example, an aspect may be set in advance according to recognition accuracy of a service required for the information process by the user of the server 10 or use of the server 10.

In step S214, the CPU 11 specifies a volume of noise generated in parallel with the utterance by using frequency analysis as an example from the voice data input at the time of executing the process in step S200, and determines whether or not the volume of the noise is equal to or more than a predetermined level Tn. In a case where the determination in step S214 is positive, the process proceeds to step S216, while in a case where the determination is negative, the process proceeds to step S224 described later. In the exemplary embodiment, in a case where the volume of the noise is larger than the predetermined level Tn, recognition of the utterance is difficult, so that a value obtained by a preliminary experiment using an actual machine or a computer simulation or the like is applied, but the present invention is not limited to this. For example, an aspect may be set in advance according to recognition accuracy of a service required for the information process by the user of the server 10 or use of the server 10.

In step S216, the CPU 11 performs control to cause the display unit of the image forming apparatus 90A to display the execution information presentation screen that displays the execution information that is the information indicating the execution result of the specific service.

Figure 5:
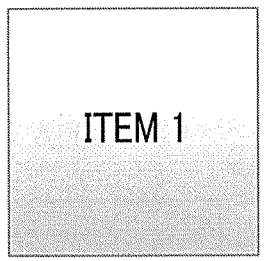
FIG. 5 is a front view showing an example of an execution information presentation screen according to the first exemplary embodiment.
Figure 5:
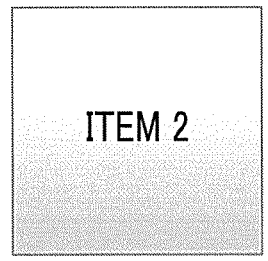

As shown in FIG. 5, a specific service to be executed from now on, an apparatus as an execution target of the specific service, and execution information (an image printing preview in the exemplary embodiment) are displayed on the execution information presentation screen according to the exemplary embodiment. Accordingly, since the speaker who performs an instruction for the execution of the service by utterance can grasp the execution information by referring to the execution information presentation screen, utterance indicating whether or not the specific service is to be executed is performed according to the execution information. Here, in a case where the speaker does not want to execute the specific service according to the execution information, the speaker again performs, by utterance, an instruction for the service to be executed. Therefore, in step S218, the CPU 11 waits until the utterance corresponding to the execution information is performed for the voice input and output apparatus 80.

In step S220, the CPU 11 specifies content of the utterance received in the process of step S218 by using a conventionally known voice recognition technique, determines whether or not to perform control to execute the specific service in accordance with the displayed execution information according to the content of the specified utterance, and in a case where the determination is negative, the process proceeds to step S222. In step S222, the CPU 11 resets the service indicated by the utterance received in the process of step S218 as a specific service, and then returns to step S216. In a case where the CPU 11 repeats the process of steps S216 to S220, in step S216, the CPU 11 performs control to cause the display unit of the image forming apparatus 90A to display the execution information presentation screen for displaying the execution result of the specific service set by the process of step S222 as the execution information.

On the other hand, in a case where the determination is positive in step S220, the process proceeds to step S224, and the CPU 11 performs control to execute the specific service according to the execution information and ends this information process.

In the exemplary embodiment, the case where the present invention is applied to the image forming system has been described, but the present invention is not limited to this form. For example, the present invention may be applied to schedule management application software. In this case, for example, a schedule registration service may be applied as a specific service, time during which a registered schedule and a newly registered schedule of the speaker who performs an instruction for the execution of the service overlap may be applied as a degree of influence of the execution result, and 0 minute may be applied as an example of a predetermined degree Ti.

That is, in this case, for example, in a case where the speaker utters "set up a meeting from 15 o'clock to 16 o'clock on Feb. 5, 2020.", but another schedule has already been registered in the schedule of the speaker from 15:30 to 16 o'clock on Feb. 5, 2020, the degree of influence of the execution result is 30 minutes, which is larger than the predetermined degree Ti, so that the determination of the process of step S210 shown in FIG. 4 becomes positive. On the other hand, in a case where a schedule has been not registered in the schedule of the speaker from 15 o'clock to 16 o'clock on Feb. 5, 2020, the degree of influence of the execution result is 0 minute, which is equal to or less than the predetermined degree Ti, so that the determination of the process of step S210 shown in FIG. 4 becomes negative.

In a case where the present invention is applied to the schedule management application software, as the degree of influence of the execution result, the same as above may be applied in the case where the schedule already registered by the speaker and the schedule newly registered overlap, or time between each schedule may be applied in a case where the schedule is not overlapped but is close to each other. In this case, the shorter the time between each schedule, the higher the degree of influence of the execution result.

Second Exemplary Embodiment

In the first exemplary embodiment, the case where the present invention is applied to an image forming system and schedule management application software has been described, but in a second exemplary embodiment, a case where the present invention is applied to an air conditioning system that executes services for a plurality of air conditioning apparatuses will be described.

Figure 6:
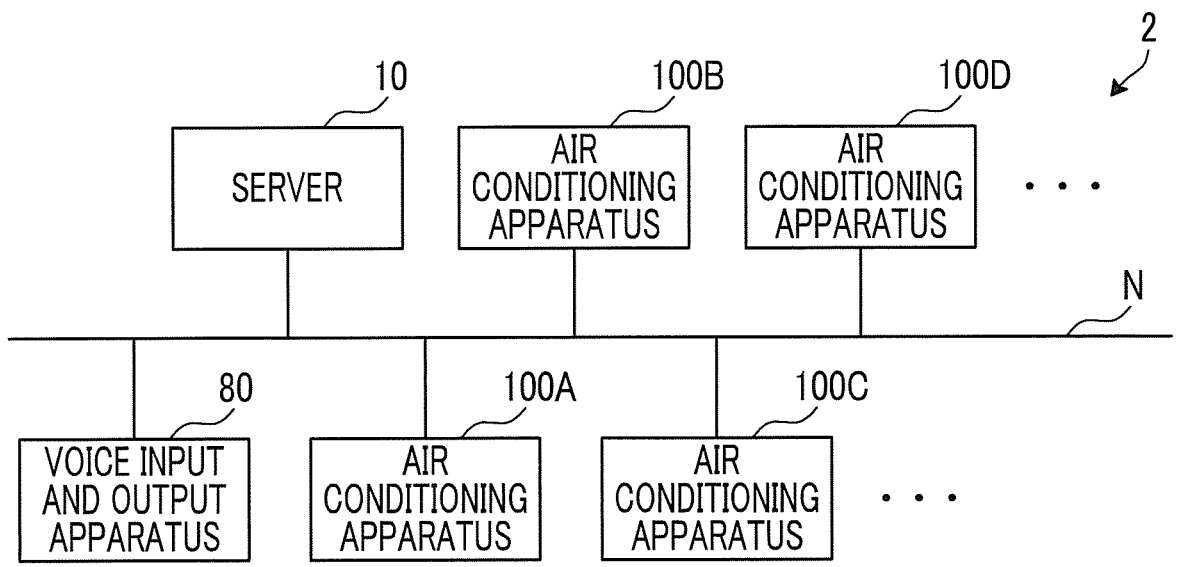
FIG. 6 is a block diagram showing an example of a configuration of an air conditioning system according to a second exemplary embodiment.

First, a configuration of an air conditioning system 2 according to the second exemplary embodiment will be described with reference to FIG. 6. The same components in FIG. 6 as components in FIG. 1 are denoted by reference numerals identical with reference numerals in FIG. 1, and the description thereof will be omitted as appropriate. As shown in FIG. 6, the air conditioning system 2 according to the second exemplary embodiment includes a server 10 that plays a central role in the present system, and a plurality of air conditioning apparatuses 100A, 100B, and . . . . Hereinafter, in a case where the air conditioning apparatuses 100A, 100B, . . . are described without distinction, the air conditioning apparatuses will be simply referred to as an "air conditioning apparatus 100".

The air conditioning system 2 according to the second exemplary embodiment is different from the first exemplary embodiment in that the air conditioning apparatus 100 and the voice input and output apparatus 80 are configured separately. In the second exemplary embodiment, a plurality of home air conditioning apparatuses installed in the user's home of the server 10 are applied as the plurality of air conditioning apparatuses 100, and a smart speaker installed in the user's office is applied as the voice input and output apparatus 80. However, needless to say, the present invention is not limited to this form. In addition, the second exemplary embodiment is different from the first exemplary embodiment in that the voice input and output apparatus 80 includes a touch panel display.

Figure 7:
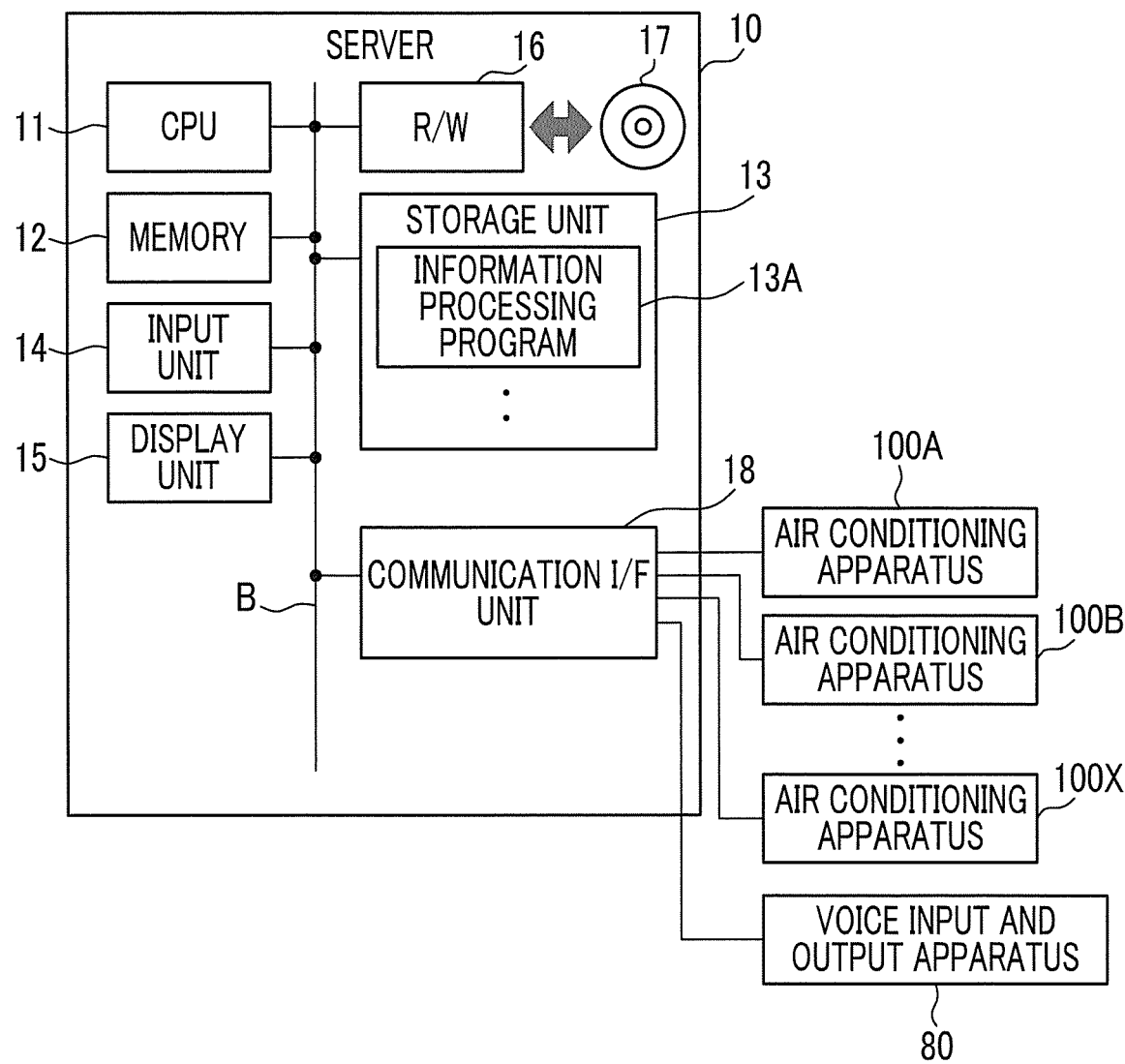
FIG. 7 is a block diagram showing an example of a hardware configuration of a server according to the second exemplary embodiment.

Next, a hardware configuration of the server 10 according to the second exemplary embodiment will be described with reference to FIG. 7. The same components in FIG. 7 as components in FIG. 2 are denoted by reference numerals identical with reference numerals in FIG. 2, and the description thereof will be omitted as appropriate. As shown in FIG. 7, the second exemplary embodiment differs from the first exemplary embodiment only in that the plurality of air conditioning apparatuses 100 and one voice input and output apparatus 80 are individually connected to the communication I/F unit 18.

Figure 8:
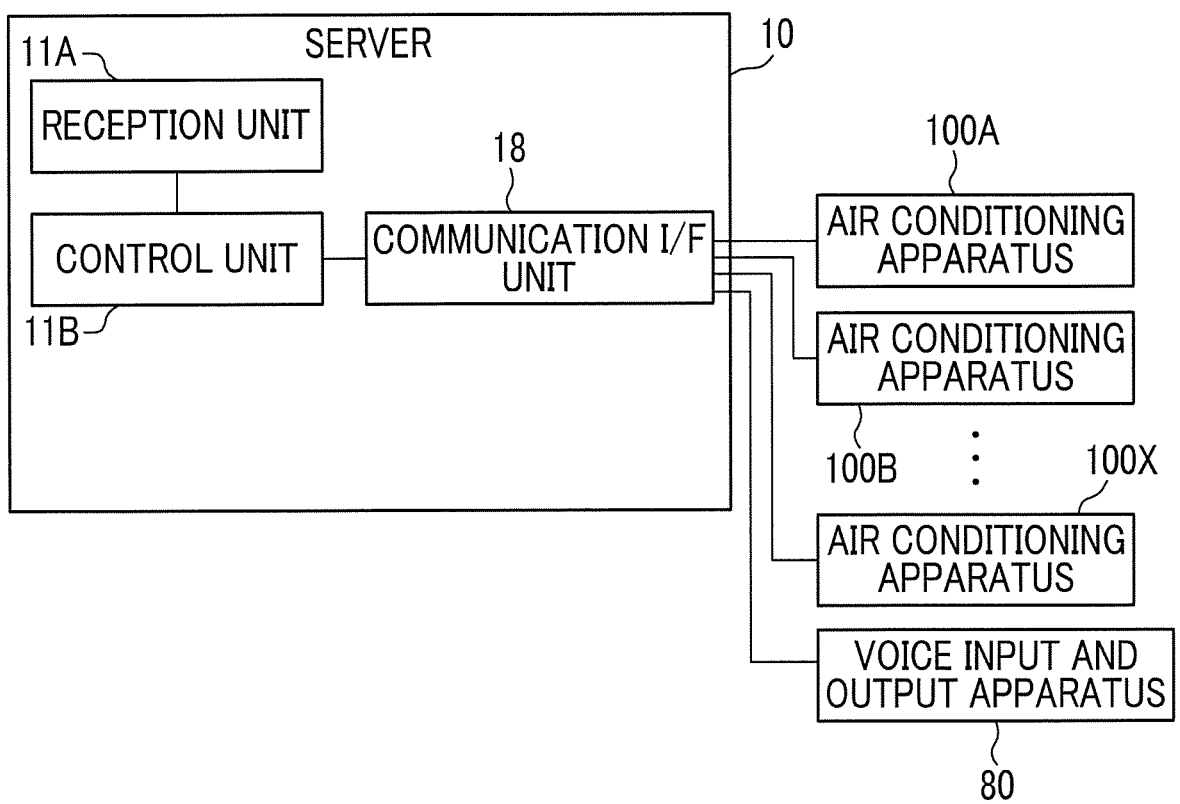
FIG. 8 is a block diagram showing an example of a functional configuration of the server according to the second exemplary embodiment.

Next, a functional configuration of the server 10 according to the second exemplary embodiment will be described with reference to FIG. 8. The same components in FIG. 8 as components in FIG. 3 are denoted by reference numerals identical with reference numerals in FIG. 3, and the description thereof will be omitted as appropriate. As shown in FIG. 8, the second exemplary embodiment differs from the first exemplary embodiment in that the plurality of air conditioning apparatuses 100 and one voice input and output apparatus 80 are individually connected to the control unit 11B.

The reception unit 11A according to the second exemplary embodiment is different from the first exemplary embodiment in that an instruction to execute a service using the air conditioning apparatus 100 is received by utterance via the voice input and output apparatus 80. In the second exemplary embodiment, a service for starting a cooling operation to the designated air conditioning apparatus 100 is applied as the service, but the present invention is not limited to this exemplary embodiment, and for example, a service for starting a heating operation and a service for starting a dehumidification operation may be applied.

In addition, the control unit 11B according to the second exemplary embodiment performs control to present execution information regardless of whether or not setting for presenting the execution information, which is information indicating the execution result of the service received by the reception unit 11A, is performed, as in the first exemplary embodiment. However, the second exemplary embodiment is different from the first exemplary embodiment in that the control unit 11B performs control to present the execution information while performing the control to execute the service. In the second exemplary embodiment, the control unit 11B may further perform the control to present the execution information even before performing the control to execute the service.

In the second exemplary embodiment, the presentation by a display of the touch panel display of the voice input and output apparatus 80 and the presentation by output of voice via the voice input and output apparatus 80 are applied as the presentation, but are not limited to these forms. For example, as the above-described presentation, a display by a display unit of an apparatus having a communication function such as a smartphone of a speaker, who has given the instruction to execute a service and a portable information terminal apparatus and a presentation by output of voice via the apparatus may be applied, or a single or a plurality of combinations of each form may be applied.

The control unit 11B according to the second exemplary embodiment performs control to present the execution information in a case where a predetermined condition is satisfied, as in the first exemplary embodiment. However, the second exemplary embodiment is different from the first exemplary embodiment in that a condition that the instruction to execute the service is performed from a position separated by a predetermined distance or more is applied as the predetermined condition.

Next, as an operation of the server 10 according to the second exemplary embodiment, an operation of the server 10 in a case of executing an information process will be described with reference to FIG. 9. In the information process shown in FIG. 9, steps of executing a process identical with the information process shown in FIG. 4 are denoted by step numbers identical with step numbers in FIG. 9.

Figure 9:
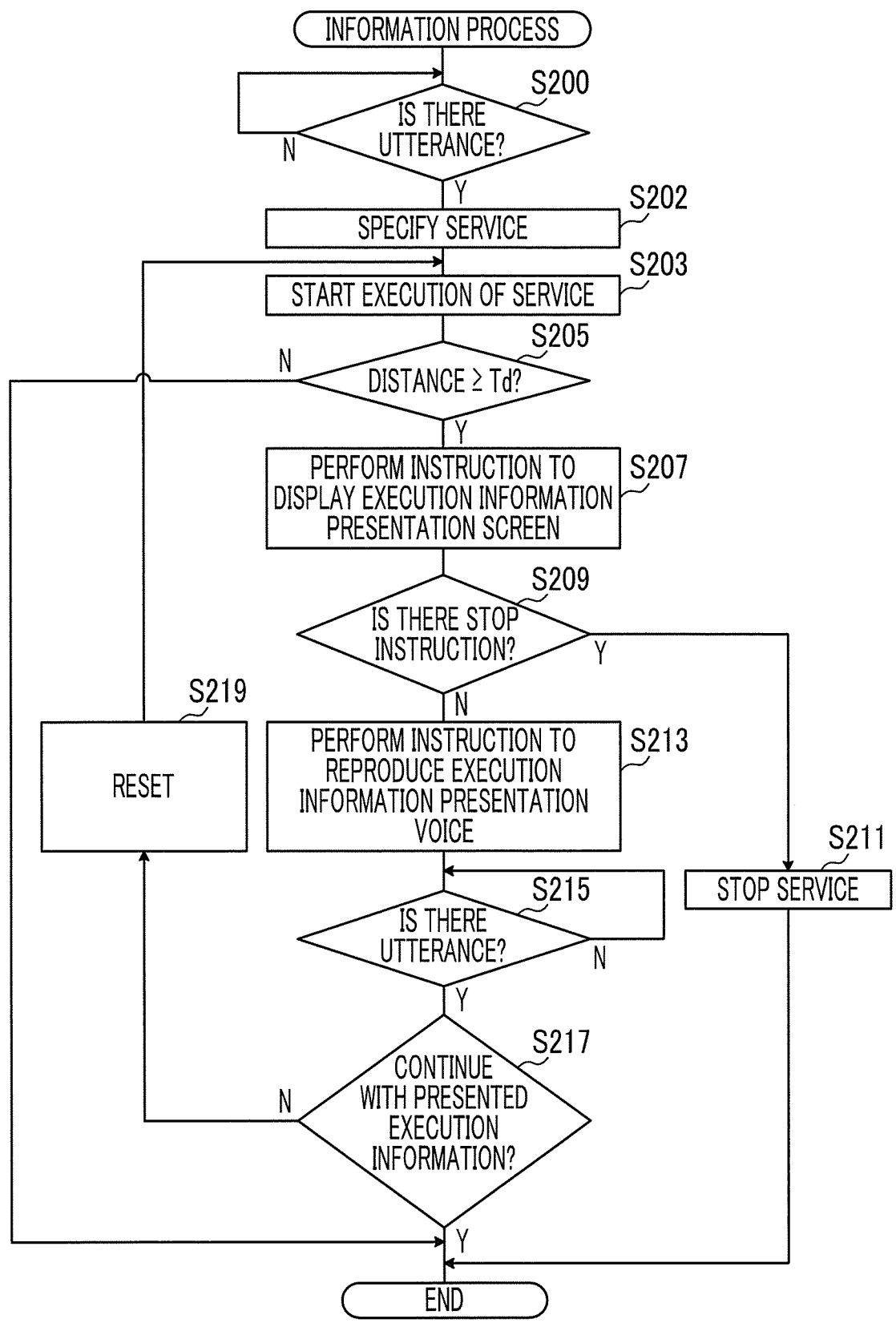
FIG. 9 is a flowchart showing an example of a flow of an information process according to the second exemplary embodiment.

The information process shown in FIG. 4 and the information process shown in FIG. 9 are different in that the process of steps S203 to S219 is applied instead of the process of step S204 and subsequent steps.

That is, in step S203 of FIG. 9, the CPU 11 performs control to execute the specific service, and in step S205, the CPU 11 determines whether or not the instruction to execute the specific service is performed from a position separated by a predetermined distance Td or more. In step S205, the CPU 11 ends this information process in a case where the determination is negative, but the process proceeds to step S207 in a case where the determination is positive. In the second exemplary embodiment, a preset distance is applied as the predetermined distance Td by the user of the server 10 or the like, but an automatically determined distance may be set as the predetermined distance Td according to a distance between the voice input and output apparatus 80 and the air conditioning apparatus 100 or the like.

In step S207, the CPU 11 performs control to display the execution information presentation screen that displays the execution information, which is the information indicating the execution result of the specific service, on the touch panel display of the voice input and output apparatus 80.

Figure 10:
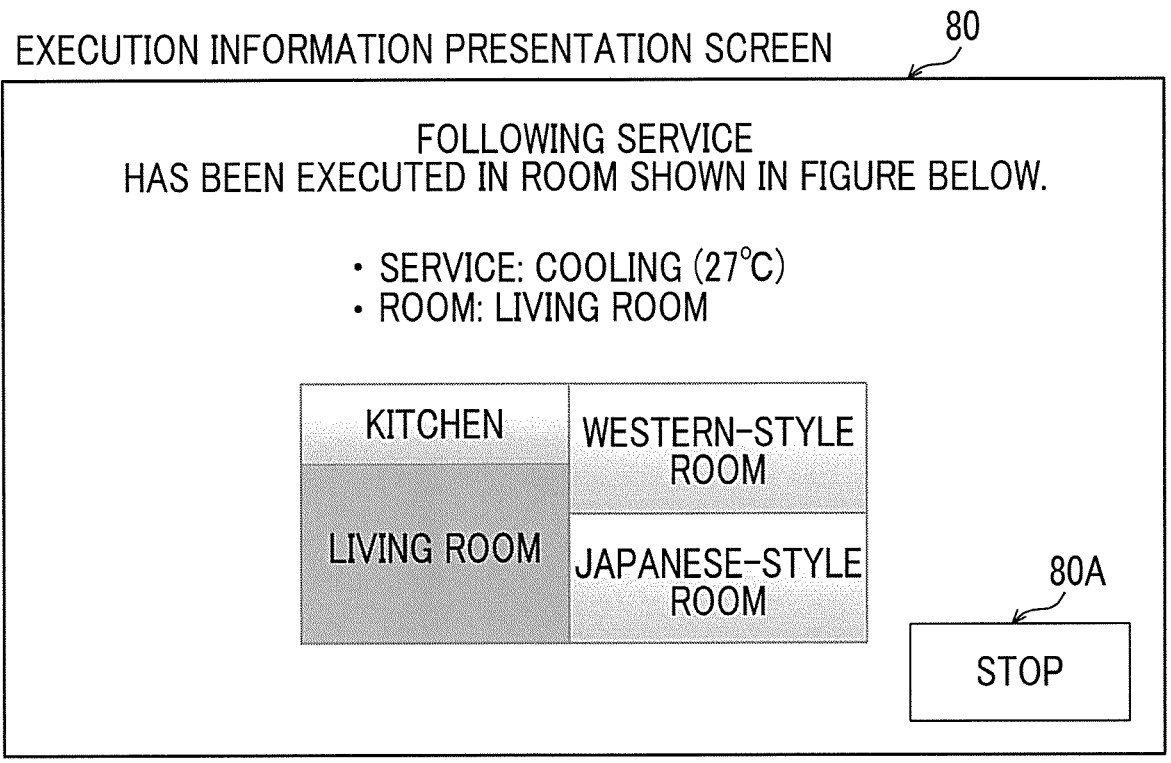
FIG. 10 is a front view showing an example of an execution information presentation screen according to the second exemplary embodiment.

As shown in FIG. 10, a specific service being executed and execution information (a name and plan view of a room in which the specific service is executed in the second exemplary embodiment) are displayed on the execution information presentation screen according to the second exemplary embodiment. As an example, in a case where the execution information presentation screen shown in FIG. 10 is displayed on the touch panel display of the voice input and output apparatus 80, the speaker who performs an instruction for the execution of the service by utterance stops the specific service being executed, that is, the cooling operation for the designated air conditioning apparatus 100, via the touch panel display, and designates a stop button 80A in a case where any service other than the specific service is not executed.

In step S209, the CPU 11 determines whether or not the stop button 80A has been designated by the speaker, and in a case where the determination is negative, the process proceeds to step S213 described later, while in a case where the determination is positive, the process proceeds to step S211. Then, the CPU 11 performs control to stop the specific service being executed, and ends the information process.

On the other hand, in step S213, the CPU 11 performs control to cause the voice input and output apparatus 80 to reproduce (outputs) voice data for reproducing the specific service and the execution information displayed on the execution information presentation screen by voice (hereinafter referred to as "execution information presentation voice"), and the process proceeds to step S215. Therefore, since the speaker can grasp the execution information even by listening to the execution information presentation voice, the speaker performs utterance indicating whether to continue the specific service or to execute a service different from the specific service according to the execution information.

Here, in a case where the speaker wants to execute the service different from the specific service, the speaker again performs, by utterance, an instruction for the service to be executed. Therefore, in step S215, the CPU 11 waits until the utterance corresponding to the execution information is performed via the voice input and output apparatus 80.

In step S217, the CPU 11 specifies content of the utterance received in the process of step S215 by using a conventionally known voice recognition technique, determines whether or not to perform control to continue the specific service with the presented execution information according to the content of the specified utterance, and in a case where the determination is negative, the process proceeds to step S219. In step S219, the CPU 11 resets the service indicated by the utterance received in the process of step S215 as a specific service, and then returns to step S203. In a case where the CPU 11 repeats the process of steps S203 to S217, in step S207, the CPU 11 performs control to cause the touch panel display of the audio input and output device 80 to display the execution information presentation screen for displaying the execution result of the specific service set by the process of step S219 as the execution information, and in step S213, the CPU 11 performs control to cause the voice input and output apparatus 80 to reproduce (outputs) the voice data for reproducing the execution information by voice.

On the other hand, in a case where the determination is positive in step S217, the CPU 11 ends this information process.

Although the exemplary embodiments have been described above, the technical scope of the present invention is not limited to the scope described in the above exemplary embodiments. Various modifications and improvements can be added to the above-described exemplary embodiments without departing from the scope of the invention, and the modified and improved embodiments are also included in the technical scope of the present invention.

In addition, the above-described exemplary embodiments do not limit the invention according to the claims, and all of the combinations of features described in the exemplary embodiments are not necessary to address the invention. The above-described exemplary embodiments include inventions at various stages, and various inventions are extracted by combining a plurality of disclosed constituent elements. Even in a case where some of constituent elements are deleted from all the constituent elements shown in the exemplary embodiments, a configuration in which some of the constituent elements are deleted can be extracted as an invention as long as the effect can be obtained.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In addition, in the above-described exemplary embodiments, the image forming apparatus, the schedule management application software, and the air conditioning apparatus are applied as examples of control targets, but the invention is not limited to these, and a mail transmission application software, a cleaning robot, or the like may be included.

Further, in the above-described exemplary embodiments, the case where the information processing program 13A is pre-installed in the storage unit 13 has been described, but the present invention is not limited to this. For example, the information processing program 13A may be stored and provided in a storage medium such as a compact disc read only memory (CD-ROM) or may be provided via a network.

Furthermore, in the above-described exemplary embodiments, the case where the information process is realized by the software configuration using a computer by executing the program has been described, but the present invention is not limited to this. For example, the information process may be realized by the hardware configuration or a combination of the hardware configuration and the software configuration.

In addition, the configuration of the server 10 described in the above-described exemplary embodiments (refer to FIGS. 2, 3, 7, and 8) is an example, and needless to say, unnecessary portions may be deleted or new portions may be added without departing from the scope of the present invention.

Further, the flow of information process described in the above-described exemplary embodiments (refer to FIGS. 4 and 9) is also an example, and needless to say, unnecessary steps may be deleted, new steps may be added, or the order of the process may be changed without departing from the scope of the present invention. For example, the information process shown in FIG. 4 may be appropriately incorporated into the information process shown in FIG. 9.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive an instruction to execute a service by utterance; and
perform a control to present execution information in a case where a number of different types of settings required for the received service is equal to or more than a predetermined number regardless of whether or not a setting for presenting the execution information is performed, the execution information being information indicating an execution result of the received service, and
execute the service without performing the control to present the execution information in a case where the number of different types of settings required for the received service is less than the predetermined number and no predetermined condition has been satisfied.

2. The information processing apparatus according to claim 1, wherein in the case where the number of different types of settings required for the received service is less than the predetermined number, the processor is also configured to perform the control to present the execution information in a case where at least one of a predetermined condition is satisfied.

3. The information processing apparatus according to claim 2,
wherein the predetermined condition is a condition that the instruction to execute the service is performed from a position separated by a predetermined distance or more.

4. The information processing apparatus according to claim 2,
wherein the predetermined condition is a condition that an apparatus as an execution target of the received service cannot be specified.

5. The information processing apparatus according to claim 2,
wherein the predetermined condition is a condition that a content of the received service includes a predetermined expression.

6. The information processing apparatus according to claim 2,
wherein the predetermined condition is a condition that a degree of influence of the execution result is larger than a predetermined degree.

7. The information processing apparatus according to claim 2,
wherein the predetermined condition is a condition that a volume of the utterance is equal to or less than a predetermined level.

8. The information processing apparatus according to claim 2,
wherein the predetermined condition is a condition that a volume of noise generated in parallel with the received utterance is equal to or more than a predetermined level.

9. The information processing apparatus according to claim 1,
wherein the processor is configured to further receive an instruction by a speaker, who has given the instruction, according to the presentation of the execution information.

10. The information processing apparatus according to claim 2,
wherein the processor is configured to further receive an instruction by a speaker who has given the instruction, according to the presentation of the execution information.

11. The information processing apparatus according to claim 2, wherein the processor is configured to further receive an instruction by a speaker who has given the instruction, according to the presentation of the execution information.

12. The information processing apparatus according to claim 3,
wherein the processor is configured to further receive an instruction by a speaker who has given the instruction, according to the presentation of the execution information.

13. The information processing apparatus according to claim 4,
wherein the processor is configured to further receive an instruction by a speaker who has given the instruction, according to the presentation of the execution information.

14. The information processing apparatus according to claim 5,
wherein the processor is configured to further receive an instruction by a speaker who has given the instruction, according to the presentation of the execution information.

15. The information processing apparatus according to claim 9,
wherein the processor is configured to perform control to execute a service according to the further received instruction.

16. The information processing apparatus according to claim 1,
wherein the processor is configured to perform control to cause a control target apparatus, which is configured separately from the information processing apparatus, to execute the received service.

17. The information processing apparatus according to claim 16,
wherein the information processing apparatus is a smart speaker.

18. The information processing apparatus according to claim 16,
wherein the control target apparatus is an image forming apparatus.

19. A non-transitory computer readable medium storing an information processing program for causing a computer to execute a process, the process comprising:
receiving an instruction to execute a service by utterance; and
performing a control to present execution information in a case where a number of different types of settings required for the received service is equal to or more than a predetermined number regardless of whether or not a setting for presenting the execution information is performed, the execution information being information indicating an execution result of the received service, and
execute the service without performing the control to present the execution information in a case where the number of different types of settings required for the received service is less than the predetermined number and no predetermined condition has been satisfied.

* * * * *